(12) United States Patent  
Prat et al.

(10) Patent No.: US 9,538,246 B2  
(45) Date of Patent: *Jan. 3, 2017

(54) MAP YOUR MOVIE

(71) Applicant: Cisco Technology, Inc., San Jose, CA (US)

(72) Inventors: Yann Prat, Elancourt (FR); Laurent Gardes, Meudon (FR); Olivier Lacour, Paris (FR); Berangere Lallemant, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/001,324

(22) Filed: Jan. 20, 2016

(65) Prior Publication Data

US 2016/0156976 A1 Jun. 2, 2016

Related U.S. Application Data

(63) Continuation of application No. 14/239,895, filed as application No. PCT/IB2012/054578 on Sep. 5, 2012, now Pat. No. 9,277,166.

(Continued)

(51) Int. Cl.
*H04N 5/91* (2006.01)
*H04N 21/4722* (2011.01)
(Continued)

(52) U.S. Cl.
CPC ...... *H04N 21/4722* (2013.01); *H04N 5/44582* (2013.01); *H04N 5/91* (2013.01);
(Continued)

(58) Field of Classification Search
None
See application file for complete search history.

(56) References Cited

U.S. PATENT DOCUMENTS 5,805,733 A 9/1998 Wang et al.
6,741,790 B1 5/2004 Burgess
(Continued)

FOREIGN PATENT DOCUMENTS

CN 101854492 A 10/2010
EP 001976159 10/2008
WO WO2007/129865 11/2007

OTHER PUBLICATIONS

CN Office Action and Search Report, dated Oct. 17, 2016, issued by the Chinese Patent Office in a counterpart Chinese application (201280043623.6), English summery and associate comments included.

(Continued)

*Primary Examiner* — Eileen Adams
(74) *Attorney, Agent, or Firm* — Samuel M. Katz

(57) ABSTRACT

A method of displaying an interactive geographical representation associated with a video content item is described. The method includes: playing the video content item, wherein the video content item includes at least one scene; requesting relevant metadata associated with the at least one video scene, the relevant metadata including a geographical representation and geolocation metadata associated with the at least video scene; receiving the relevant metadata; and displaying an interactive geographical representation along with at least one visual indication, wherein the at least one visual indication is associated with the at least one video scene and positioned at a location indicated by the geolocation metadata. Related systems, apparatus and methods are also described.

16 Claims, 6 Drawing Sheets

Related U.S. Application Data

(60) Provisional application No. 61/573,536, filed on Sep. 8, 2011.

(51) Int. Cl.
    *H04N 21/41* (2011.01)
    *H04N 21/422* (2011.01)
    *H04N 21/81* (2011.01)
    *H04N 21/472* (2011.01)
    *H04N 5/445* (2011.01)
    *H04N 21/431* (2011.01)

(52) U.S. Cl.
    CPC ..... *H04N 21/4104* (2013.01); *H04N 21/4126* (2013.01); *H04N 21/42209* (2013.01); *H04N 21/4316* (2013.01); *H04N 21/47208* (2013.01); *H04N 21/8133* (2013.01); *H04N 2005/4456* (2013.01)

(56) References Cited

U.S. PATENT DOCUMENTS

| | | | |
|---|---|---|---|
| 9,277,166 B2 * | 3/2016 | Prat | H04N 21/4104 |
| 2002/0048054 A1 | 4/2002 | Ohata et al. | |
| 2003/0126616 A1 | 7/2003 | Dewa | |
| 2009/0021592 A1 * | 1/2009 | Oyama | H04N 5/23293 348/220.1 |
| 2010/0030806 A1 | 2/2010 | Kuhlke et al. | |
| 2010/0160014 A1 * | 6/2010 | Galasso | A63B 24/0021 463/6 |
| 2011/0148936 A1 | 6/2011 | Bhatt | |
| 2012/0210227 A1 * | 8/2012 | Lin | G11B 27/034 715/723 |

OTHER PUBLICATIONS

EP Examination Report, dated Nov. 18, 2016, issued by the EPO in a counterpart European application (EP Application No. 12778136.7).

* cited by examiner

MAP YOUR MOVIE

The present application is a continuation of U.S. patent application Ser. No. 14/239,895, filed on Apr. 7, 2014; which was submitted under 35 U.S.C. §371 of International Application No. PCT/IB2012/054578, filed Sep. 5, 2012 and published in the English language on Mar. 14, 2013 with publication no. WO 2013/035046 A1; which claims the benefit of the filing date of US Ser. No. 61/573,536, filed Sep. 8, 2011.

FIELD OF THE INVENTION

The present invention relates to methods and apparatus for dynamic and optimal display of geographical information related to a video content item.

BACKGROUND OF THE INVENTION

In digital devices, a user interface (UI) is used to provide an easy and efficient way to use the digital device and information. A user manually moves a pointer using an input unit such as a keypad, keyboard or mouse, and can command a digital device to perform a desired operation by selecting a graphics object indicated by the pointer. A UI is typically displayed on the device's screen and navigated via a client device (e.g. a Set-Top Box). Increasingly ubiquitous companion devices such as computers, mobile telephones, tablet computers or other suitable handheld devices can also be used now for UI viewing and/or navigation. Depending on the companion device used, such UIs are usually navigated using a variety of tools including, for example, a computer mouse for a computer, keypads buttons for a mobile telephone, or even the user's fingers for UIs that support direct manipulation.

Different menus and/or applications are also accessible through a UI and provide the user with additional information related to a particular television program. A user can now browse the UI to know more about, for example, the characters, the actors, the director, etc. of a particular television program.

Hence, using a companion device as a second display may be useful to display the UI itself and/or additional information related to a particular television program, thereby providing the user with an enhanced viewing experience. Indeed, the television can be viewed in an optimal manner (e.g. in full size on a first display) while displaying additional information on a second display. Furthermore, a significant amount of additional information may be used to enhance the user's viewing experience.

U.S. Issued Pat. No. 6,741,790 of Red Hen Systems Inc. describes a hardware device (40) and software, which are configurable and operable in three modes: recording mode, indexing mode, and playback mode. In the recording mode, the hardware device (40) is connected to a GPS receiver (44) and video recording device (42), and permits GPS data to be recorded on the same recording medium that images are recorded on using the video recording device (42). As a result, a particular geographic location associated with particular images can be directly referenced by GPS data. After recording the images, the hardware device (40) is connected to a computer (46) having the software of the present invention installed, and the system causes GPS data to be transferred from the recording medium to the computer (46) as the recorded images are replayed. During this step, called the indexing mode, the computer (46) draws a map showing all of the GPS referenced locations recorded on the recording medium. Each map location represents a location where images were recorded with GPS data. Once the indexing mode is completed, the system can be used to play back the images recorded, in accordance with the selection of a location on a map. During this step, called the playback mode, a marker may be selected on the computer (46) generated indexed map, and the system will cause the video recording device (42) to play back the images that were recorded at that selected location. Alternatively, if the recorded images have been transferred to some other media, for example CD ROM or hard disk, the system will cause the computer (46) to play back the images that were recorded at that selected location.

U.S. Published Patent Application 2002/0048054 of Ohata et al., describes an on-demand image delivery server delivering designated image data based on a request from a client terminal with one or a plurality of retrieval items as a retrieval condition inputted from the client terminal, made up by a retrieval function portion, which retrieves one or a plurality of image resource databases, and a retrieval result displaying function portion, which displays on the screen of the client terminal for confirmation of contents of image data subject to delivery, simplified image data of the image data matching a retrieval condition and/or data regarding attached contents-related information.

U.S. Published Patent Application 2011 of Apple Inc., describes systems and techniques for associating and presenting media content items with locations on a geographical track path. For example, the frames of a video segment can be associated with locations on a track path. The track path can be based on position data, including position coordinates and a corresponding time coordinates, obtained while the video frames were captured. Locations for the video frames can be determined based on a start time of the video segment, a frame rate of the video segment, and the position data. The video segment can be displayed with user controls that enable a user to manipulate the frame of the video segment being displayed including a time indicator and a location indicator displayed on the track path.

SUMMARY OF THE INVENTION

There is thus provided in accordance with an embodiment of the present invention a method of displaying an interactive geographical representation associated with a video content item, the method including: playing the video content item, wherein the video content item includes at least one scene; requesting relevant metadata associated with the at least one video scene, the relevant metadata including a geographical representation and geolocation metadata associated with the at least video scene; receiving the relevant metadata; and displaying an interactive geographical representation along with at least one visual indication, wherein the at least one visual indication is associated with the at least one video scene and positioned at a location indicated by the geolocation metadata.

Further, in accordance with an embodiment of the present invention, the method further includes: retrieving a time elapsed since a start time for the video content item; and identifying at least one video scene according to the elapsed time, the identified at least one video scene corresponding to a video scene of the video content item displayed at the elapsed time.

Still further, in accordance with an embodiment of the present invention, the receiving the relevant metadata includes receiving, for at least one video scene, one or more of: a thumbnail image; a summary; geolocation metadata; a geographical representation; and a scale factor.

Additionally, in accordance with an embodiment of the present invention, the displaying the interactive geographical representation includes centering the interactive geographical representation on the location indicated by the geolocation metadata.

Further, in accordance with an embodiment of the present invention, the at least one visual indication is a thumbnail image characterizing the at least one video scene.

Still further, in accordance with an embodiment of the present invention, the method further includes: receiving an input relevant to the interactive geographical representation displayed along with the at least one visual indication; updating the interactive geographical representation in response to the input; and displaying the updated interactive geographical representation.

Additionally, in accordance with an embodiment of the present invention, the receiving an input includes receiving a user input requesting further information associated with the at least one visual indication.

Further, in accordance with an embodiment of the present invention, the receiving an input includes receiving a user input requesting displaying the interactive geographical representation according to a different scale factor.

Still further, in accordance with an embodiment of the present invention, the receiving an input includes receiving an input signaling a video scene change.

Additionally, in accordance with an embodiment of the present invention, the playing the video content item includes playing the video content item at a first device; and the displaying an interactive geographical representation includes displaying an interactive geographical representation at a second device.

Further, in accordance with an embodiment of the present invention, the video content item is an event requested by a user.

Still further, in accordance with an embodiment of the present invention, the first device is a client device.

Additionally, in accordance with an embodiment of the present invention, the receiving an input and the displaying the updated interactive geographical representation include receiving an input and displaying the updated interactive geographical representation at a second device.

Further, in accordance with an embodiment of the present invention, the second device is a companion device.

There is also provided with a further embodiment of the present invention, a companion device including: means for playing a video content item, wherein the video content item includes at least one video scene; means for requesting relevant metadata associated with the at least one video scene, the relevant metadata including a geographical representation and geolocation metadata associated with the at least video scene; means for receiving the relevant metadata; and means for displaying an interactive geographical representation along with at least one visual indication, wherein the at least one visual indication is associated with the at least one video scene and positioned at a location indicated by the geolocation metadata.

There is also provided with a further embodiment of the present invention, a companion device including: a video player operative to play a video content item, wherein the video content item includes at least one video scene; a processor operable to request relevant metadata associated with the at least one video scene, the relevant metadata including a geographical representation and geolocation metadata associated with the at least one video scene; a receiver operable to receive the relevant metadata; and a rendering screen operable to display an interactive geographical representation along with at least one visual indication, wherein the at least one visual indication is associated with the at least one video scene and positioned at a location indicated by the geolocation metadata.

BRIEF DESCRIPTION OF THE DRAWINGS

The present invention will be understood and appreciated more fully from the following detailed description, taken in conjunction with the drawings in which.

DETAILED DESCRIPTION OF EMBODIMENTS

In the following description, numerous specific details are set forth in order to provide a thorough understanding of the various principles of the present invention. However, those skilled in the art will appreciate that not all these details are necessarily always required for practicing the present invention. In this instance, well-known circuits, control logic, and the details of computer program instructions for conventional algorithms and processes have not been shown in detail in order not to obscure the general concepts unnecessarily.

Although the principles of the present invention are largely described herein in relation to a television broadcast environment and related television applications, this is an example selected for convenience of presentation, and is not limiting.

System Architecture

Figure 1:
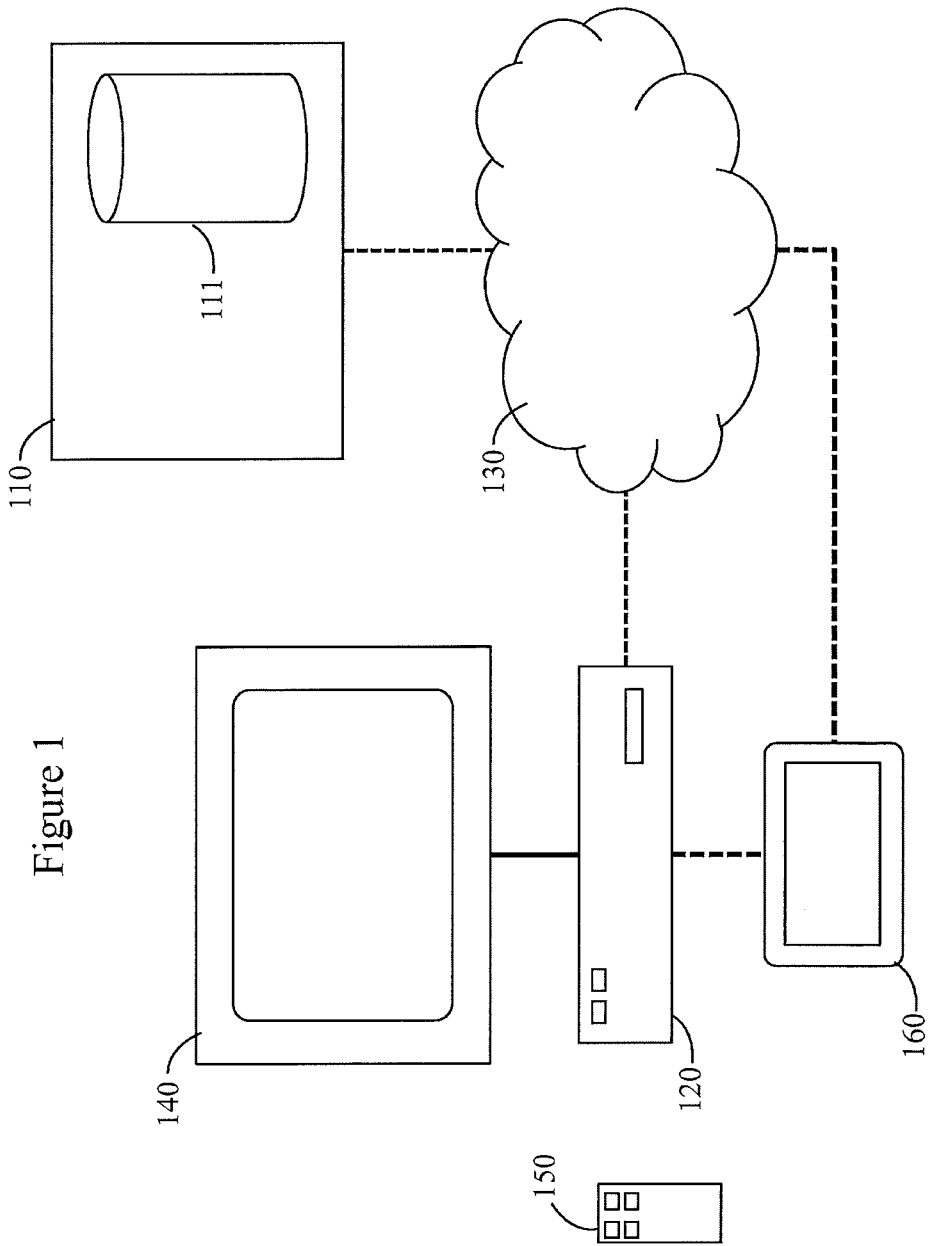
FIG. 1 is a simplified block diagram illustration of a system constructed and operative in accordance with an embodiment of the present invention.

Reference is now made to FIG. 1, which is a simplified block diagram illustration of a system constructed and operative in accordance with an embodiment of the present invention.

A headend 110 typically communicates with a plurality of client devices 120 via a communication network 130. Additionally or alternatively, a plurality of headends 110 communicate with a single client device 120 or with a plurality of client devices 120 via the communication network 130. For simplicity of depiction and description, and without limiting the generality of the invention, only one client device 120 communication with only one headend 110 is illustrated in FIG. 1.

The communication network 130 is a one-way or two-way communication network that includes at least one of the following: a satellite based communication network; a cable based communication network; a conventional terrestrial broadcast television network; a telephony based communication network; a telephony based television broadcast network; a mobile-telephony based television broadcast network; an Internet Protocol (IP) television broadcast network; and a computer based communication network. It is appreciated that in alternative embodiments, the communication network 130 may, for example, be implemented by a one-way or two-way hybrid communication network, such as a combination cable-telephone network, a combination satellite-telephone network, a combination satellite-computer based communication network, or by any other appropriate network. Other ways of implementing the communication network 130 will be apparent to someone skilled in the art.

The system of FIG. 1 comprises a client device 120 disposed between a headend 110 and a display device 140. Client device 120 comprises a digital video recorder (DVR) that typically includes a high capacity storage device, such as a hard disk or high capacity memory. Client device 120 is coupled to a display device 140. Client device 120 typically comprises a tuner, a demultiplexer, a decoder, a receiver and a descrambler. It is appreciated that the client device 120 comprises standard hardware components and software components, as is well known in the art.

Client device 120 is typically connected in operation to display device 140 via a digital AV interface (e.g. HDMI, DVI, etc.) or via an analogue AV interface (e.g. component (RGB, YPbPr), composite (NTSC, PAL, SECAM), S-video, SCART, RF coaxial, D-Terminal (D-tanshi) etc.). While shown as separate entities in FIG. 1, the client device 120 may be integral with the display device 140 in other embodiments of the present invention.

Client device 120 typically receives, demultiplexes, decodes and decrypts/descrambles as necessary a broadcast television stream received from a headend 110 optionally under control of a conditional access device such as removable security element as is well known in the art. The removable security element typically includes a smart card as is well known in the art. The output from client device 120 comprises a decoded and decrypted/descrambled as necessary audio video (AV) stream ready to be displayed on the display device 140.

Display device 140 is typically operated by a user, for example via a remote control unit (RCU) 150. Using a RCU 150, a user can select an AV content to view, such as a live event broadcast, a Video-On-Demand (VOD) asset, a recorded event, etc. The operating system software within client device 120 monitors user interaction with display device 140 and/or client device 120 and maintains a database of service and event information. The operating system software enables the user to choose an event/service to view.

Furthermore, a companion device 160 is provided that is operable to communicate with the client device 120 using any suitable connectivity link (e.g. wireless connection over Internet Protocol). The companion device 160 is further operable to communicate with the headend 110 through the communication network 130. FIG. 1 shows only one communication network 130. However, those skilled in the art will appreciate that the companion device 160 may communicate directly with the headend 110 using the same or a different communication network 130. The companion device 160 may be, for example, but without limiting the generality of the invention, a laptop computer, a desktop or personal computer (PC), a tablet computer such as an iPad™, a mobile computing device, such as a Personal Digital Assistant (PDA), mobile phone, or any suitable handheld device. Companion device 160 comprises a processor, a video player, a receiver and a rendering screen. It is appreciated that the companion device 160 comprises standard hardware components and software components, as is well known in the art. The companion device 160 may further be any device able to communicate with a client device 120 and/or a headend 110 as long as it includes a rendering screen for displaying content and data information to a user.

A user is typically able to select an event or a service to be displayed on the display device 140. Furthermore, the user is also able to run an application that may be locally executed on the companion device 160 thereby enabling communication with the client device 120 and the headend 110. Those skilled in the art will appreciate that the application may also be run by the user using an RCU 150 via a dedicated menu in the UI rendered on the display device 140. The application is operable to communicate with the client device 120 to retrieve information about the event currently being displayed on the display device 140. Then, the application is further operable to query a database 111 typically located at the headend premises using the information retrieved from the client device 120. The database 111 typically returns relevant metadata, including geolocation metadata, for each video scene of the event currently being displayed on the display device 140. Finally, the relevant metadata may be used to display a geographical representation of the event currently being displayed on the display device 140. Displaying such a geographical representation of an event currently being displayed on a display device 140 enriches the user's viewing experience by giving him a better understanding of where and how the action takes place.

Figure 2:
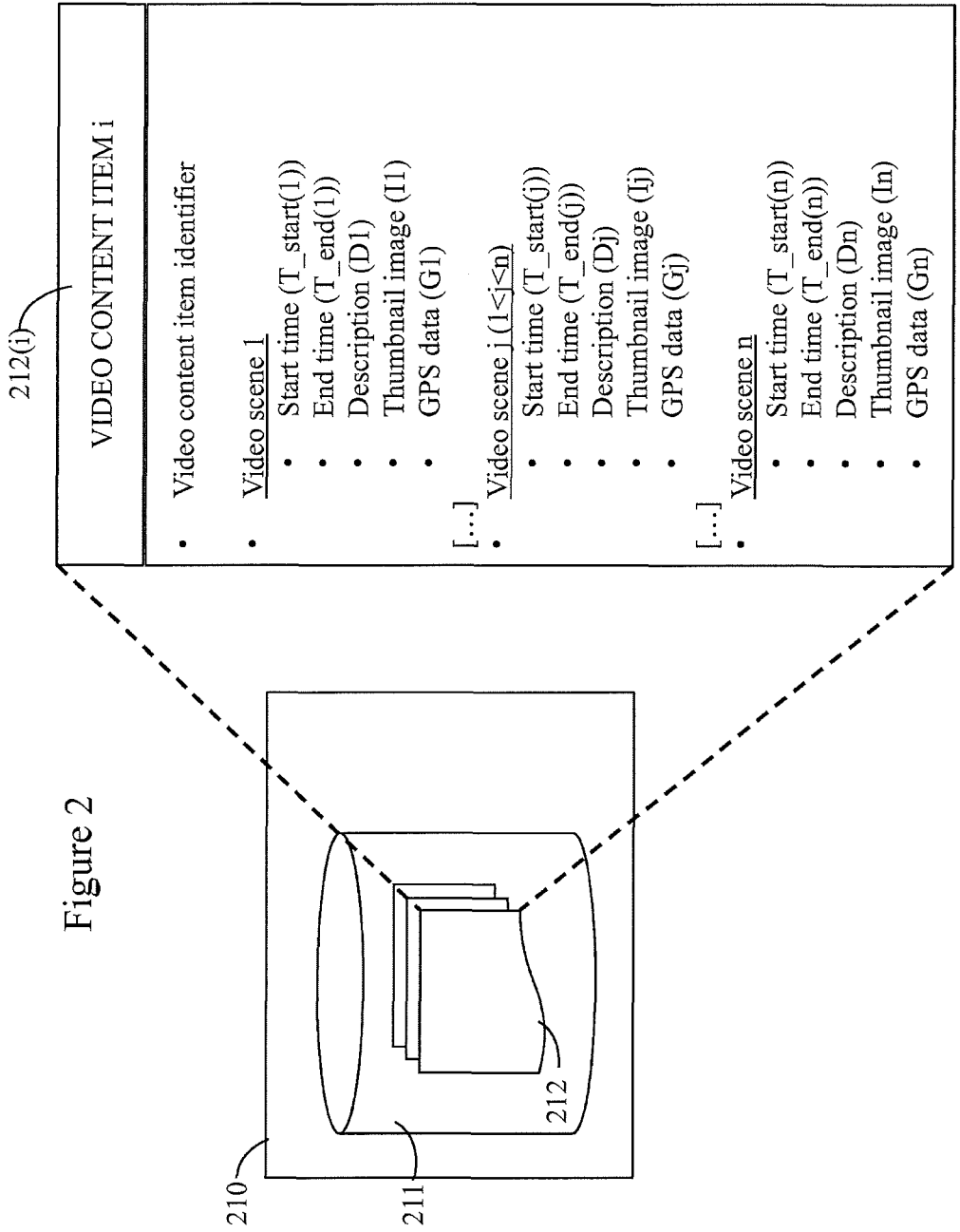
FIG. 2 is a simplified block diagram illustration of a headend database constructed and operative in accordance with an embodiment of the present invention.

Reference is now made to FIG. 2, which is a simplified block diagram illustration of a headend database constructed and operative in accordance with an embodiment of the present invention.

The database 211 is typically located at the headend 210 and typically comprises metadata related to a plurality of video content items 212. Those skilled in the art will appreciate that this database 211 may be in any suitable form and located in any suitable part of the system of the present invention. Other ways of implementing the database 211, such as using a plurality of databases, will be apparent to someone skilled in the art.

A video content item 212(i) typically comprises a sequence of video frames representing one or more video scenes. It will be appreciated that in a theatrical presentation such as a movie or television program, a video scene typically corresponds to the place where an action, real or imaginary, occurs. In an embodiment of the present invention, a video content item 212(i) is identified by a video content identifier and a set of metadata is provided for each video scene of the video content item 212(i). For a particular video scene of a video content item 212(i), the set of metadata typically comprises at least:

a start time (T_start(j));
an end time (T_end(j));
a description; and
geolocation metadata.

The geolocation metadata may be provided, for example, as Global Positioning System (GPS) data, Globalnaya Navigatsionnaya Sputnikovaya Sistema (GLONASS) data, GALILEO data, BeiDou (Compass) Navigation Satellite System, Geographic Messaging System (GMS), or any suitable positioning data. The geolocation metadata typically corresponds to a location where the action of the particular video scene, real or imaginary, occurs. The description metadata is typically a summary of the video scene but may also comprise further metadata such as the name of the characters, the name of the actors, etc., given as non-limiting examples. Additional metadata may also be provided as part of the set of metadata such as a thumbnail image characterizing a particular video scene, detailed information on the place where the action of a particular video scene, real or imaginary, occurs (e.g. text information, pictures, etc.), a geographical representation (e.g. a map) relevant to the video content item 212(i) and retrieved from any suitable content source and/or a scale factor to be used for drawing and/or displaying the geographical representation. These additional metadata may also comprise data indicating a position of the video scene among the video content item 212(i). For example, these data may indicate that the video scene is, for example but without limiting the generality of the present invention, the first, the third, etc. or the last video scene of the video content item. Another way to indicate the position may be indicating the previous and next video scene of the video content item. When the geographical representation is drawn and/or displayed, these data may be used to indicate the logical sequence of the video scenes. In another embodiment of the present invention, several sets of metadata may be provided for a single video scene. This may be useful in situations where the action of a video scene occurs in several places. In a further embodiment of the present invention, a plurality of maps is provided, each map from said plurality of maps being associated to a video scene of the video content item 212(i). The geographical representation may be, for example, and without limiting the generality of the present invention, a geographical map of a particular area (city, region, country, etc.), real or imaginary, showing where (in which street(s), road(s), etc.) an action occurs.

The video content items 212 which populate the database and their associated metadata may be selected and provided by a TV broadcaster, a platform operator, a content provider or any third party entity. Hence, a wide selection of regular TV broadcast events, VOD assets, and other video content items may be available to be used by the application and/or the end user. In another embodiment of the present invention, the headend database 211 is further configurable to provide video content items of interest to a user by retrieving information from the client device. Upon connection to the client device, the headend database 211 may determine that additional video content items may be stored in the database 211. These additional video content items may include, for example:

events of adjacent services (i.e. events of services listed in the Electronic Program Guide (EPG) by a television operator immediately before and after the one currently being displayed on the display device 140; and/or
events of the n services listed in the Electronic Program Guide (EPG) by a television operator before and after the one currently being displayed on the display device 140); and/or
events of a user's favorite services (i.e. a list of services marked by the user as favorite services in an EPG); and/or
events of the most frequently watched services; and/or
events of the last watched services; and/or
events of the services matching the user's profile or interest; and/or
events of the services in which said user has made the most recordings; and/or
services browsed in an Electronic Program Guide; and/or
services listed by a television operator; and/or
events recorded by the user.

Furthermore, the database 211 may also be updated regularly by a TV broadcaster, a platform operator, a content provider or any third party entity in order to make available new video content items 212 and their associated metadata to users of the application.

Finally the headend database 211 is able to support any traditional query system. For example, but without limiting the generality of the invention, Structured Query Language (SQL) may be used by the companion device 160 for querying and retrieving the set of relevant metadata from the headend database 211.

Operation

Figure 3:
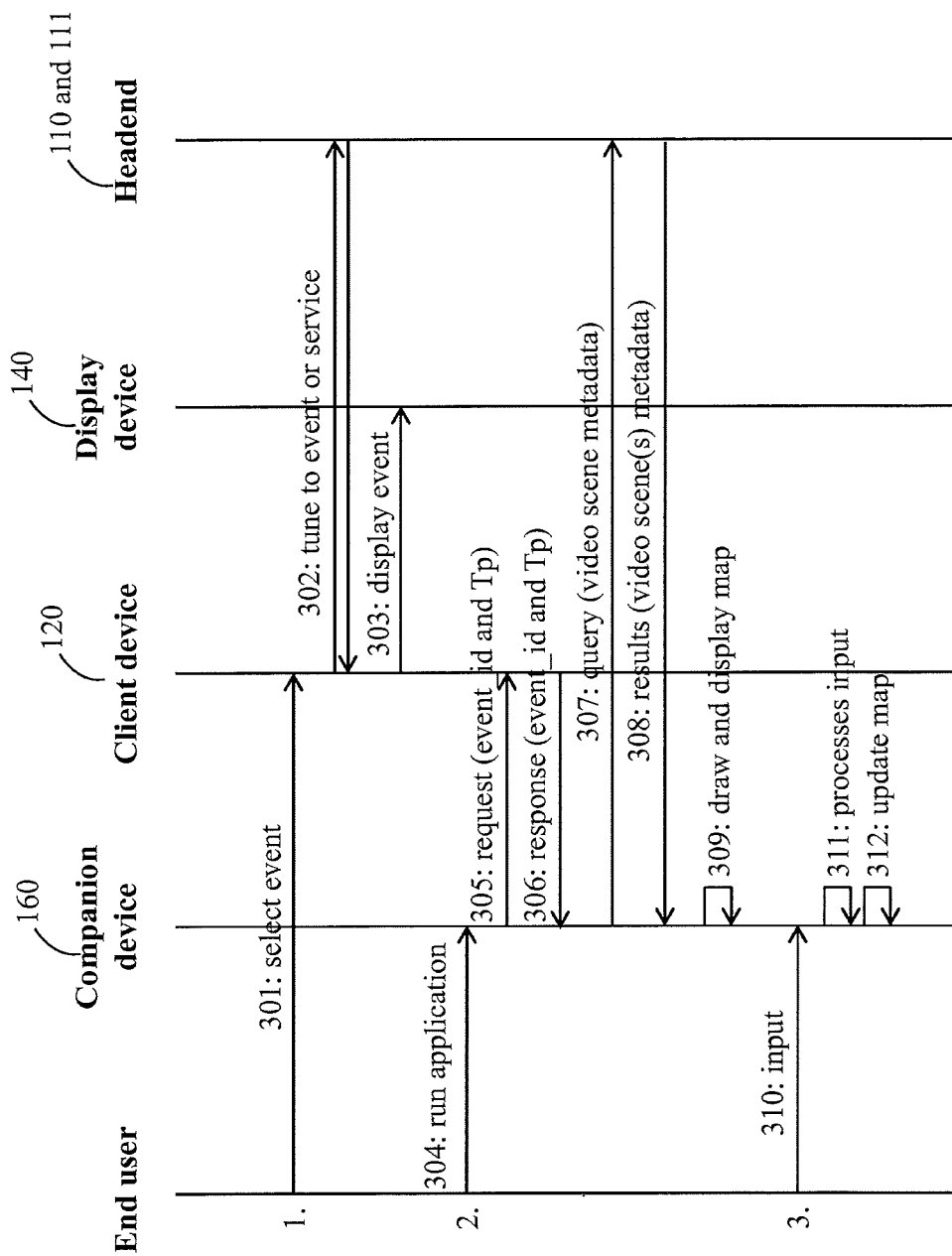
FIG. 3 is an information flow diagram showing the information flows between the different apparatuses of the system constructed and operative in accordance with embodiments of the present invention.

Reference is now made to FIG. 3, which is an information flow diagram showing the information flows between the different apparatuses of the system of FIGS. 1 and 2:

At step 301, the user can select an event or a service to be displayed on the display device 140 by operating an RCU 150 e.g. a remote control. Upon reception of the user's choice, the client device tunes to the selected event or service on a headend 110 (step 302) and demultiplexes, decodes and decrypts/descrambles as necessary the broadcast television stream received from the headend 110 in order to display the selected event on the display device 140 (step 303).

In parallel to watching the displayed event, the user may decide, in an embodiment of the present invention, to run an application on his companion device 160 (step 304) to obtain additional geographical information regarding the event currently being displayed on the display device 140. The application is typically executed locally on the companion device 160. Those skilled in the art will appreciate that the application may be a distributed computing application and therefore, that the application may be executed in any or in a plurality of suitable computing devices of a distributed computing system. A connection is established with the client device 120 and the companion device 160 then outputs a request to the client device 120 to retrieve data that specifically characterizes the event currently being displayed on the display device (step 305). For example, but without limiting the generality of the invention, the request may be achieved using a JavaScript Object Notation (JSON) request over HyperText Transfer Protocol (HTPP). The client device 120 processes the request and responds by sending back to the companion device relevant data including, but not limited to, an identifier and a timeline position of the event currently being displayed on the display device (step 306). The identifier identifies the event being displayed on the display device 140 at the time the user launched the application and/or at the time the client device 120 processed the request. The identifier is typically the event$_{id}$ retrieved from an Event Information Table (EIT) but any other identifier may be used as long as it is interpretable and suitable for use by the companion device 160. The timeline position typically corresponds to the time elapsed since the beginning of the event e.g. the duration between the start time of the event and the time when the user launched the application on the companion device 160 and/or the client device 120 processed the request.

At the time the companion device 160 receives the relevant data (identifier and timeline position of the event currently being displayed on the display device 140), a subsequent query is generated by the application and sent to the headend database 111 in order to retrieve relevant metadata related to the event currently being displayed on the display device 140 (step 307). The event identifier is used to identify in the database 111 the corresponding video content item by comparing it to the different video content item identifiers present in the database 111.

Once the corresponding video content item is identified as being the one being currently displayed on the display device 140, the timeline position is used to identify which video scene is currently being displayed on the display device 140. The relevant metadata corresponding to the identified video scene are then retrieved and sent back to the companion device 160 as results of the query (step 308).

At step 309, the companion device 160 receives the relevant metadata and uses them to draw and display a geographical representation (e.g. a map) corresponding to the geographical area where the action of the identified video scene takes place. The map may be retrieved by the companion device 160 from any suitable content source such as, for example, the Internet, from other users or may be provided as part of the relevant metadata associated to each video content item 212(*i*) and then displayed on the companion device 160. In another embodiment of the present invention, the map may be drawn directly by the companion device 160 for display. Additionally, the map is overlaid by a visual indication indicating the position of the identified video scene on the map. Those skilled in the art will appreciate that this visual indication may be in any appropriate form as long as the user of the application is able to easily see the position of the identified video scene on the map. Having this map rendered on the companion device 160 enhances the user's viewing experience by having a map optimally displayed on the companion device 160. In another embodiment of the present invention, the relevant metadata may be received and processed at the client device 120. Then, a map may be drawn and/or displayed on either the display device 140 or the companion device 160. When the map is drawn and/or displayed on the companion device 160, the companion device 160 may be used as a simple secondary display and is not used for processing any data. It may be useful in order to balance the workload since the client device 120 may have more computing power and resources than the companion device 160.

At step 310, the user may enter an input by interacting with the map displayed on the companion device 160. This input may be, for example, a request for displaying additional information related to a particular video scene and/or a request for displaying additional information on the actors or characters present in a particular video scene and/or a request for displaying the map according to a different scale factor etc. The companion device may process the input (step 311) and update the map in response to the user's input (step 312).

Figure 4:
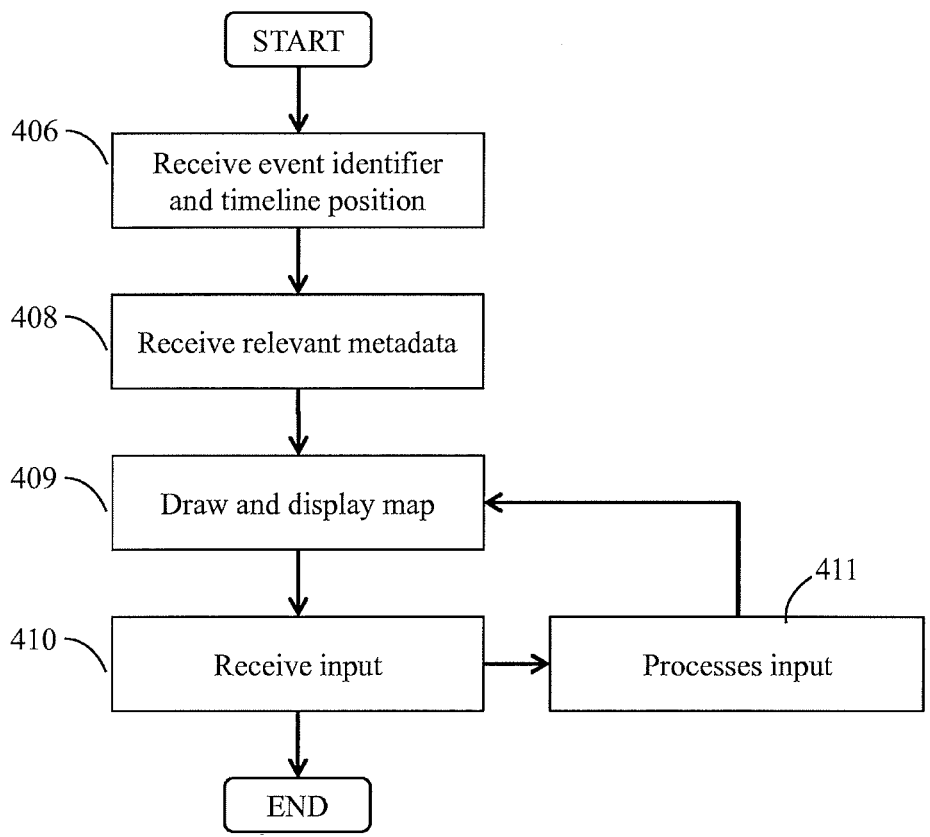
FIG. 4 is a flow chart of a method of operating a companion device in accordance with an embodiment of the present invention.

Reference is now made to FIG. 4, which is a flow chart diagram of a method of operating a companion device 160 constructed and operative in accordance with an embodiment of the present invention.

At start, a user may decide to run an application to obtain geographical information related to an event currently being displayed on a display device 140. The application is typically executed locally on the companion device 160 and first outputs a request that is sent to the client device 120 to retrieve the identifier (event_id) and the timeline position (Tp) of the event currently being displayed on the display device 140. Then, in response to the request, the companion device 160 receives the event$_{id}$ and the timeline position of the event currently being displayed on the display device 140 (step 406).

At step 408, the companion device 160 uses the received information (event_id and Tp) to query a database 111 located at the headend 110. The event_id is used to identify in the database 111 the corresponding video content item 212(*i*) by comparing it to the different video content identifiers present in the database. Once the corresponding video content item 212(*i*) is identified as being the one being currently displayed on the display device 140, the timeline position is used to determine which video scene is currently being displayed on the display device 140. The timeline position (Tp) is compared to the start and end times (T_start( ) and T_end( )) of each video scene of the video content item. As disclosed hereinabove, for each video content item 212 populating the database, relevant metadata corresponding to the different video scenes of the video content item are provided, including start and end times of each of the video scenes. The video scene (VSj) of the video content item 212(*i*) currently being displayed on the display device 140 may be identified when it is determined that:

the timeline position (Tp) is more than a start time of a video scene (T_start(j))—j being an integer number comprised between 1 and n, n also being an integer number corresponding to the last scene of the identified video content item: Tp>T_start(j); and the timeline position (Tp) is less than an end time of a video scene (T_end(j)): Tp<T_end(j)

In an embodiment of the present invention, the relevant metadata corresponding to the video scene (VSj) in the video content item 212(*i*) identified as being currently displayed on the display device 140 are then sent back to the companion device 160. At step 408, the companion device 160 receives the relevant metadata and uses them to draw and/or display a geographical representation (e.g. a map) corresponding to the geographical area where the action of the video scene (VSj) takes place (step 409). Additionally, the GPS data of the video scene (Gj) currently being displayed on the display device 140 may be used to position the visual indication on the map. Furthermore, the map displayed on the companion device 160 may be centered so that the visual indication is positioned at the center of the companion device display screen.

In another embodiment of the present invention, the visual indication indicating the position of a video scene on the map may be a thumbnail image. This thumbnail image specifically characterizes a particular video scene (VSj) of a video content item 212(*i*) so that the user, when looking at the map, can easily identify this particular video scene (VSj). The thumbnail image may be, for example, a still image or a video frame retrieved from any appropriate content source.

In a further embodiment of the present invention, the video content item 212(*i*) comprises video frames representing multiple video scenes. Hence, the relevant metadata corresponding to the video scenes (VS1; . . . ; VSj; . . . ; VSn) in the identified video content item 212(*i*) are retrieved and sent back to the companion device 160. Consequently, the companion device 160 receives the relevant metadata at step 408 and uses them to draw and/or display a geographical representation (e.g. a map) corresponding to the geographical area where the action of the different video scenes (VS1; . . . ; VSj; . . . ; VSn) takes place (step 409). Additionally, the GPS data of the video scenes (Gl; . . . ; Gj; . . . ; Gn) are used to position visual indications on the map indicating the places where the action of the different video scenes (VS1; . . . ; VSj; . . . ; VSn) takes place. Furthermore, the map displayed on the companion device 160 may be centered so that the visual indication indicating the position of the video scene (VSj) currently being displayed on the display device 140 is at the center of the companion device display screen.

In another embodiment of the present invention, the visual indication indicating the position of the video scene (VSj) currently being displayed on the display device 140 is different to the other visual indications thereby easing identification of the position of the video scene (VSj) currently being displayed on the display device 140. Those skilled in the art will appreciate that the visual indication of the video scene (VSj) currently being displayed on the display device 140 may be in any appropriate form (e.g. color, shape, size, etc.) as long as it is possible to easily identify it among the other visual indications. For example, the visual indications could be displayed as a series of numbers or timestamps reflecting the progression or timeline of the associated video scenes.

It will be apparent to someone skilled in the art that displaying a meaningful map to the user depends on the type of event displayed on the display device 140. Indeed, the event displayed on the display device 140 may have, for example, several different video scenes, real or imaginary, taking place in many different places. Therefore, it may be difficult to choose an adequate scale factor for drawing and displaying a map that is easily readable and understandable by the end user. The scale factor used to draw and display a map may therefore be chosen so that the visual indications can be easily viewable by the end user. In an embodiment of the present invention, the scale factor used by the companion device 160 may be, for example, specified by the user and/or provided by the headend database 111 along with the relevant metadata and/or retrieved from the application settings. In another embodiment of the present invention, the companion device 160 may determine that the scale factor to be used may be chosen so that, for example:

all the visual indications are displayed; and/or n (e.g. a pre-defined number) visual indications are displayed; and/or the visual indications corresponding to the video scenes just before and just after the video scene currently being displayed on the display device 140 are displayed; and/or the maximum of visual indications are displayed according to a minimum size of the visual indications (i.e. a minimum size of a thumbnail image may be defined in order to be properly viewable for the user).

At step 410, the companion device 160 may receive an input. In an embodiment of the present invention, this input may be received from the user. The user may interact with the displayed map, for example, by requesting additional information related to a particular video scene and/or by requesting additional information on the actors or characters present in a particular video scene and/or by zooming in or out etc. The user may also choose to close the application at this step. In another embodiment of the present invention, the input may be received from the client device 120. As explained previously in relation to FIG. 2, when the application is launched, the companion device 160 outputs a request to the client device 120 in order to retrieve data that specifically characterize the event currently being displayed on the display device 140 (event_id and Tp). The companion device 160 may also output regular requests (e.g. every n seconds) to the client device 120 and may receive in response an input signaling a video scene change. The companion device 160 is then able to use the retrieved data to query regularly the headend database 111. By doing so, the companion device 160 is therefore able to detect a video scene change and dynamically update the map.

At step 411, the companion device 160 processes the input received. In most cases, the companion device 160 updates the map:

when the user requests additional information related to a particular video scene or related to the actors or characters present in a particular video scene, then the description metadata may be extracted from the relevant metadata associated to a particular video scene and displayed on the map;

when the user zooms in or zooms out, the companion device 160 re-draws the map according to the new scale factor and displays the map newly drawn; and when the companion device 160 detects a video scene change, the map is updated so that the visual indication, corresponding to the newly displayed video scene on the display device 140, is positioned at the center of the map.

If the user chooses to leave the application then, the companion device 160 stops requesting information from the client device 120, querying the headend database 111, displaying the map and closes the application.

Reference is now made to FIGS. 5A to 5D, which are pictorial illustrations showing different examples of screens displayed on a companion device in accordance with embodiments of the present invention.

Figure 5A:
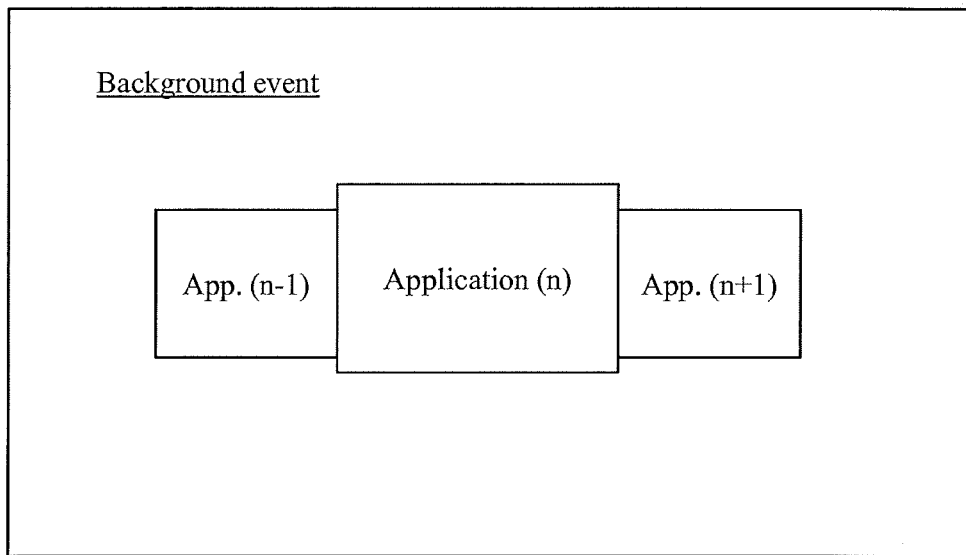
FIGS. 5A to 5D are pictorial illustrations showing different examples of screens displayed on a companion device in accordance with embodiments of the present invention.

FIG. 5A illustrates an event currently being displayed on the display device 140—referred as the background event on FIG. 5A-5D—overlaid by a menu allowing the user to select and launch a plurality of applications. As explained hereinabove in the present specification, the application may be launched either from the display device 140 or from the companion device 160. Furthermore, the geographical representation may be displayed either on the display device 140 or on the companion device 160. FIG. 5A illustrates an event currently being displayed on the displayed device overlaid by a plurality of applications. The user may use a RCU 150 or the companion device 160 to navigate through the applications displayed on the user interface and may choose one application to be launched.

Figure 5B:
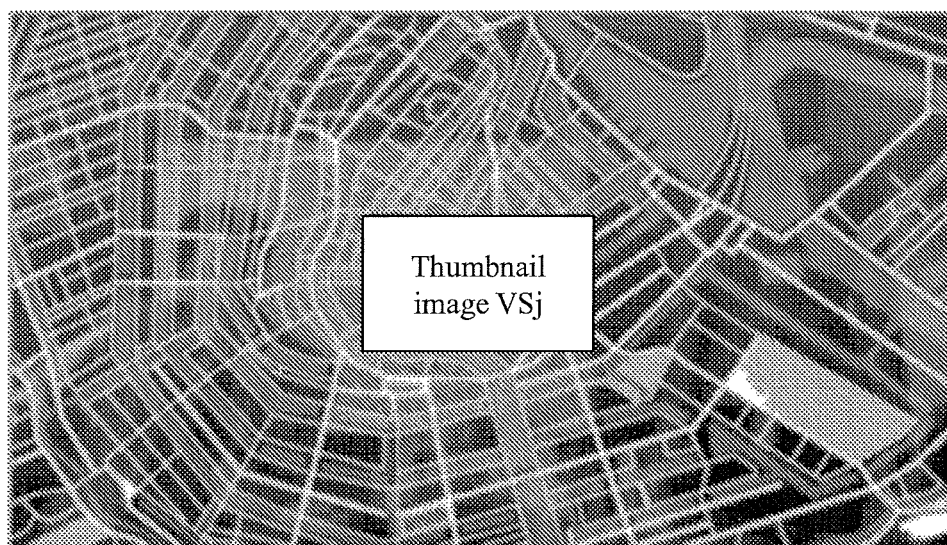
Figure 5C:
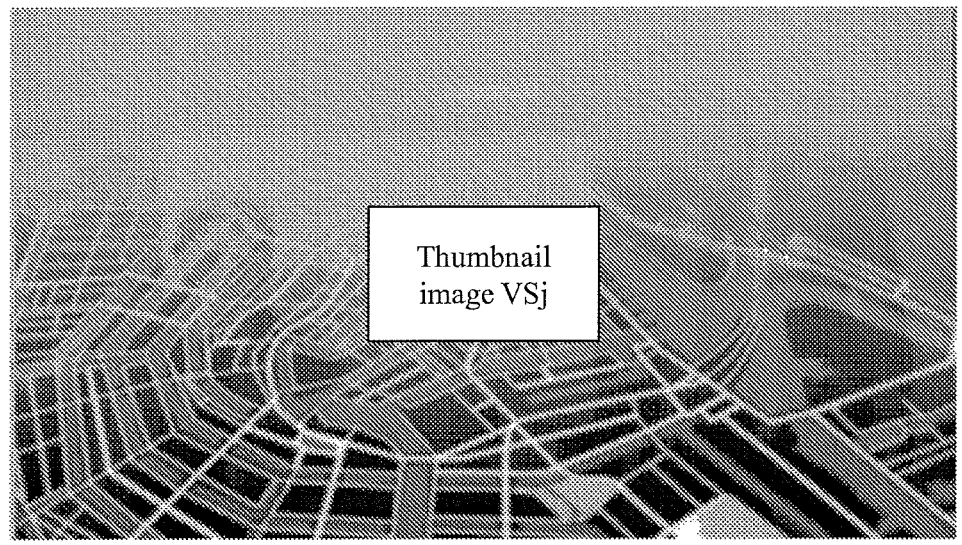

FIGS. 5B and 5C illustrates different geographical representations associated with a video content item 212(*i*) currently being displayed on the display device 140. The geographical representations are drawn and displayed on the companion device 160 in accordance with embodiments of the present invention. As explained previously in relation to FIG. 4, the companion device 160 receives the relevant metadata associated to a video scene (VSj) of the video content item 212(*i*) currently being displayed on the display device 140 and uses them to draw and/or display a geographical representation (e.g. a map) corresponding to the geographical area where the action of the video scene (VSj) takes place (step 409). Additionally, the GPS data of the video scene (Gj) currently being displayed on the display device 140 is used to position the visual indication (e.g. a thumbnail image characterizing the video scene (VSj) currently being displayed on the display device 140) on the map. Furthermore, the map displayed on the companion device 160 is centered so that the thumbnail image is positioned at the center of the companion device display screen.

Figure 5D:
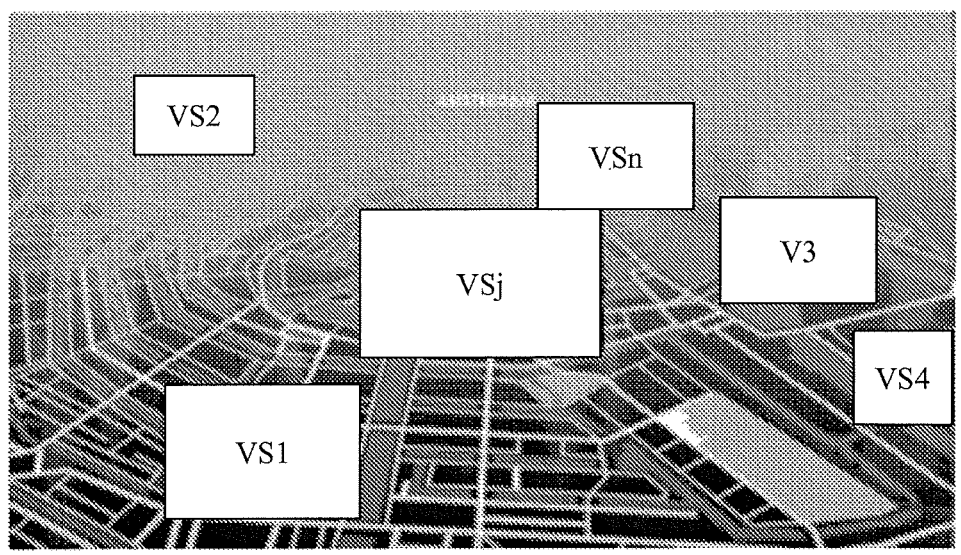

FIG. 5D illustrates a geographical representation associated with a video content item 212(*i*) currently being displayed on the display device 140. The geographical representation is drawn and/or displayed on the companion device 160 in accordance with a further embodiment of the present invention. As described previously in relation to FIG. 4, the companion device 160 receives the relevant metadata associated to video scenes (VS1; VS2, VS3; VS4; ...; VSj; ...; VSn) in the identified video content item 212(1) (step 408) as results of the query sent to the headend database 111. Consequently, the companion device 160 uses the sets of relevant metadata associated to the different video scenes (VS1; VS2, VS3; VS4; ...; VSj; ...; VSn) to draw and/or display a geographical representation (e.g. a map) corresponding to the geographical area where the action of the different video scenes (VS1; VS2, VS3; VS4; ...; VSj; ...; VSn) takes place (step 409). Additionally, the GPS data of the video scenes (G1; G2, G3; G4; ...; Gj; ...; Gn) are used to position visual indications (e.g. thumbnail images) on the map indicating the places where the action of the different video scenes (VS1; VS2, VS3; VS4; ...; VSj; ...; VSn) takes place. Furthermore, the map displayed on the companion device 160 may be centered so that the thumbnail image of the video scene (VSj) currently being displayed on the display device 140 is at the center of the companion device display screen.

Although the above embodiments have been described in the context of DVB implementation, someone skilled in the art will realize that other implementations are possible.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather the scope of the invention is defined by the appended claims and equivalents thereof.

The invention claimed is:

1. A method of displaying a displayed interactive geographical representation associated with a video content item, said method comprising:
    playing said video content item, wherein said video content item comprises a plurality of video scenes;
    requesting relevant metadata associated with said video content item from an external database, said relevant metadata comprising a geographical representation of said video content item and geolocation metadata associated with said plurality of video scenes, said geographical representation corresponding to a geographical area where action of said plurality of video scenes of said video content item takes place;
    receiving said relevant metadata; and
    upon receiving said relevant metadata, displaying said displayed interactive geographical representation of said video content item along with a plurality of visual indications, wherein at least one of said visual indications is a thumbnail image characterizing a particular video scene of said plurality of video scenes, and each of said plurality of visual indications is representative of one video scene of said plurality of video scenes, and each of said plurality of visual indications is displayed on said displayed interactive geographical representation at a location indicated by said geolocation metadata associated with said plurality of video scenes.

2. The method of claim 1, said method further comprising:
    retrieving a time elapsed since a start time for said video content item; and
    identifying at least one video scene according to said elapsed time, said identified at least one video scene corresponding to a video scene of said video content item displayed at said elapsed time.

3. The method of claim 2, wherein said displaying said displayed interactive geographical representation of said video content item comprises centering said display interactive geographical representation on said location indicated by said geolocation metadata relevant to said identified at least one video scene.

4. The method of claim 1 wherein said receiving said relevant metadata comprises receiving, for each video scene of said plurality of video scenes, one or more of:
    a thumbnail image;
    a summary;
    geolocation metadata;
    a geographical representation; and
    a scale factor.

5. The method of claim 1, said method further comprising
    receiving an input relevant to said displayed interactive geographical representation of said video content item displayed along with said plurality of visual indications;
    updating said displayed interactive geographical representation of said video content item in response to said input; and
    displaying said updated displayed interactive geographical representation of said video content item.

6. The method of claim 5, wherein said receiving an input comprises receiving a user input requesting further information associated with one of said plurality of visual indications.

7. The method of claim 5, wherein said receiving an input comprises receiving a user input requesting displaying said displayed interactive geographical representation of said video content item according to a different scale factor.

8. The method of claim 5, wherein said receiving an input comprises receiving an input signaling a video scene change.

9. The method of claim 5, wherein said receiving an input and said displaying said updated displayed interactive geographical representation of said video content item comprise receiving an input and displaying said updated displayed interactive geographical representation of said video content item at a second device.

10. The method of claim 9, wherein said second device is a companion device.

11. The method of claim 1, wherein said playing said video content item comprising playing said video content item at a first device; and wherein said displaying said displayed interactive geographical representation of said video content item comprises displaying said displayed interactive geographical representation of said video content item at a second device.

12. The method of claim 11, wherein said video content item is an event requested by a user.

13. The method of claim 11, wherein said first device is a client device.

14. The method of claim 11, wherein said second device is a companion device.

15. A companion device comprising:
    means for playing a video content item, wherein said video content item comprises a plurality of video scenes;
    means for requesting relevant metadata associated with said video content item from an external database, said relevant metadata comprising a geographical representation of said video content item and geolocation metadata associated with said plurality of video scenes, said geographical representation corresponding to a geographical area where action of said plurality of video scenes of said video content item takes place;

means for receiving said relevant metadata; and means for displaying a displayed interactive geographical representation of said video content item along with a plurality of visual indications upon receiving said relevant metadata, wherein at least one of said visual indications is a thumbnail image characterizing a particular video scene of said plurality of video scenes, and each of said plurality of visual indications is representative of one video scene of said plurality of video scenes, and each of said plurality of visual indications is displayed on said displayed interactive geographical representation at a location indicated by said geolocation metadata associated with said plurality of video scenes.

16. A companion device comprising:

a video player operative to play a video content item, wherein said video content item comprises a plurality of video scenes;

a processor operable to request relevant metadata associated with said video content item from an external database, said relevant metadata comprising a geographical representation of said video content item and geolocation metadata associated with said plurality of video scenes, said geographical representation corresponding to a geographical area where action of said plurality of video scenes of said video content item takes place;

a receiver operable to receive said relevant metadata; and a rendering screen operable to display a displayed interactive geographical representation of said video content item along with a plurality of visual indications, wherein at least one of said visual indications is a thumbnail image characterizing a particular video scene of said plurality of video scenes, and each of said plurality of visual indications is representative of one video scene of said plurality of video scenes, and each of said plurality of visual indications is displayed on said displayed interactive geographical representation at a location indicated by said geolocation metadata associated with said plurality of video scenes.

* * * * *

UNITED STATES PATENT AND TRADEMARK OFFICE
CERTIFICATE OF CORRECTION

PATENT NO. : 9,538,246 B2  
APPLICATION NO. : 15/001324  
DATED : January 3, 2017  
INVENTOR(S) : Yann Prat et al.

Page 1 of 1

It is certified that error appears in the above-identified patent and that said Letters Patent is hereby corrected as shown below:

On the Title Page

Item (56), Other Publication, Column 2, Line 3, "summery" to read as --summary--.

In the Claims

Column 14, Line 5, Claim 3, "display" to read as --displayed--.

Column 14, Line 17 approx., Claim 5, "comprising" to read as --comprising:--.

Column 14, Line 47 approx., Claim 11, "comprising" to read as --comprises--.

Signed and Sealed this  
Fourth Day of April, 2017

Michelle K. Lee  
*Director of the United States Patent and Trademark Office*